June 18, 1929.  A. HUND  1,717,451
METHOD OF PRODUCING OSCILLATIONS FROM PIEZO ELECTRIC PLATES
Original Filed Sept. 30, 1925
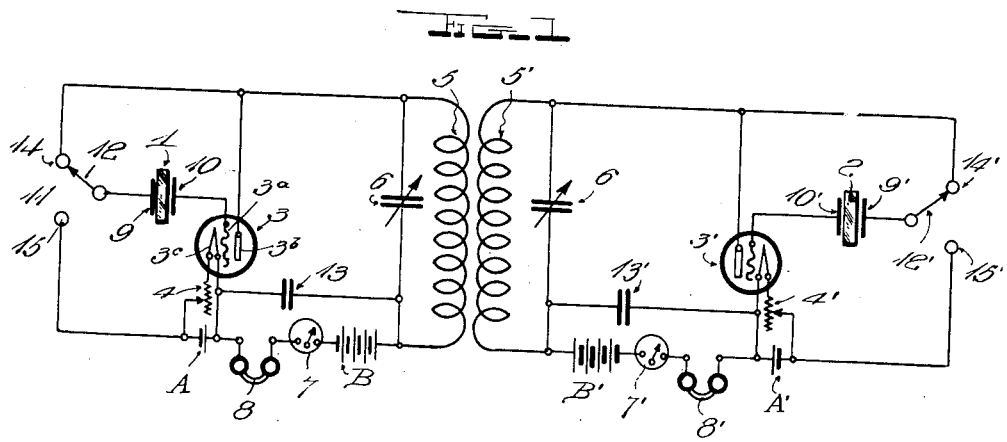
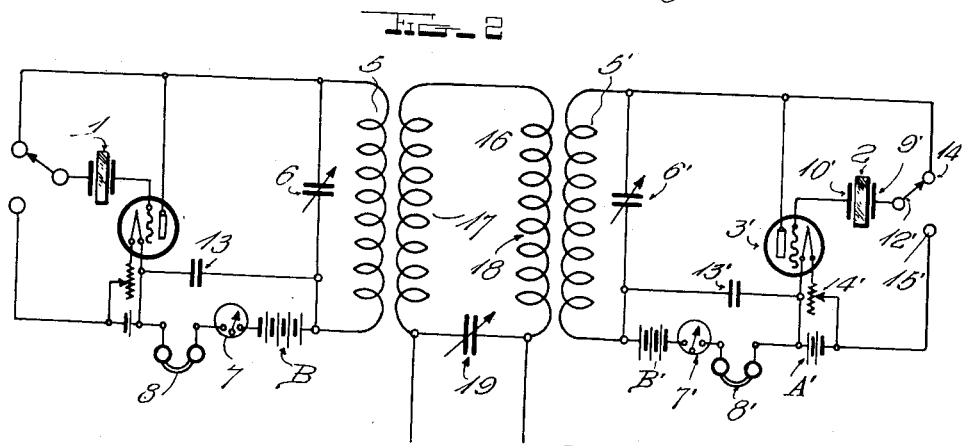
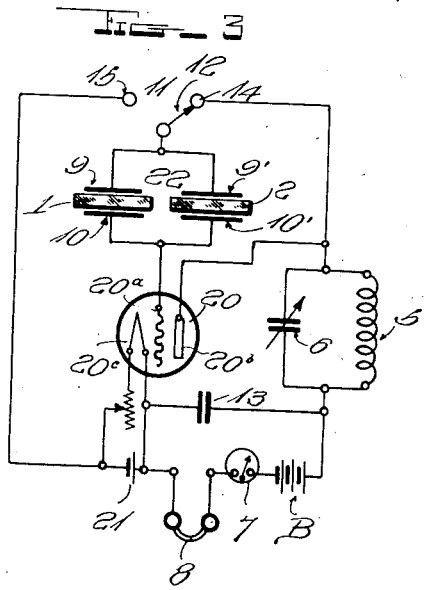
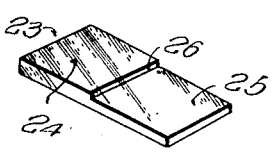
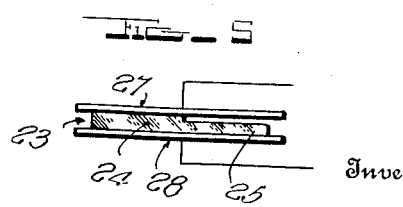
Inventor
By August Hund,
John B. Brady
Attorney Patented June 18, 1929.

1,717,451

UNITED STATES PATENT OFFICE.

AUGUST HUND, OF BETHESDA, MARYLAND, ASSIGNOR TO WIRED RADIO, INC., OF NEW YORK, N. Y., A CORPORATION OF DELAWARE.

METHOD OF PRODUCING OSCILLATIONS FROM PIEZO-ELECTRIC PLATES.

Original application filed September 30, 1925, Serial No. 59,675. Divided and this application filed February 15, 1927. Serial No. 168,383.

My invention relates broadly to electrical systems and more particularly to the production of constant frequency electrical oscillations from piezo electric bodies.

This application is a division of my application Serial Number 59,675, filed September 30, 1925.

One of the objects of my invention is to provide a constant frequency generator for electrical oscillations where a piezo electric plate is employed for maintaining the frequency of the generator constant at all times.

Another object of my invention is to provide a piezo electric crystal system which may be conveniently employed for the production of low frequency oscillations without the necessity of providing piezo electric plates of inconvenient size and weight and of unreasonable cost.

Still another object of my invention is to provide a method of producing low frequency oscillations from a single piezo electric plate of relatively small size.

A further object of my invention resides in the employment of piezo electric plate ground in step-like formation and capable of sustaining oscillations at a plurality of different frequencies simultaneously for reducing the frequency of electrical oscillations under control of a piezo electric plate.

My invention will be more clearly understood from the following specification by reference to the accompanying drawings, in which:

Figure 1 illustrates one method which I employ for reducing the frequency of electrical oscillations under control of a plurality of piezo electric plates; Fig. 2 shows a modified circuit arrangement which I may employ for securing low frequency oscillations from piezo electric plates; Fig. 3 shows another circuit arrangement I may employ in producing low frequency oscillations from relatively small piezo electric plates; and Figs. 4 and 5 illustrate a piezo electric plate of small size ground in accordance with the principles of my invention for the production of low frequency oscillations.

In my copending application Serial No. 59,677, filed September 30, 1925, I have described a method of cutting piezo electric plates which will have predetermined and uniform frequency characteristics. The fundamental frequency obtainable from a piezo electric plate of rectangular or circular form follows an empirical law which may be expressed by the following formula:

$$f = \frac{2870}{t}$$

where $t$ represents the thickness of the piezo electric plate in millimeters (mm.) and $f$ represents the frequency expressed in kilocycles (kc.) per second. From observation of this formula it is apparent that a very thick plate would be required to produce audio frequency oscillations. This plate would normally have such a thickness that it would be impracticable to employ a piezo electric plate as a constant frequency generator of low frequency currents for precision work. By my invention I render practical the use of piezo electric plates as audio frequency generators and am enabled to secure the benefits of the constant frequency characteristics of such plates by circuit arrangements and a novel method of grinding the crystals.

I may secure the production of low frequency currents by providing two high frequency piezo electric plates where the desired frequency is the difference between the frequencies of the two piezo electric plates. These plates may be connected to control independent oscillatory circuits, the effects of which are impressed upon a common or a third circuit. The plates may be parallel connected to control the same electron tube system by the resultant low frequency beat note between the high frequency oscillations or a relatively thin piezo electric plate may be ground in stepped formation in such manner that one portion of the plate tends to oscillate independently of another portion of the plate at separated high frequencies which beat with each other to produce a frequency of an order lower than the two original frequencies which is the difference in the frequencies produced by the separate portions of the plates.

Referring to the drawings in more detail, reference characters 1 and 2 designate two separate piezo electric plates each having high frequency oscillatory characteristics. The piezo electric plates are chosen such that the respective high frequency currents thereof are separated by a difference in frequency which is equal to the frequency of the oscillations which it is desired to produce. The piezo electric plate 1 is arranged to control an electron tube 3 having grid electrode $3^a$, plate electrode $3^b$ and filament electrode $3^c$. The cathode $3^c$ is heated from battery A under control of rheostat 4. The output circuit of the tube 3 includes the plate electrode $3^b$, inductance 5, shunted by tuning capacity 6, high potential battery B, ammeter 7 and test telephones 8. A by-pass condenser 13 is shunted around battery B, ammeter 7 and test telephones 8 for by-passing high frequency oscillations. The grid circuit of the tube 3 from grid electrode $3^a$ connects through the piezo electric plate 1 secured between plates 9 and 10 with the switching device 11. The switch arm 12 may be connected with either contact 14 or 15 to connect the quartz plate 1 between the grid electrode $3^a$ and the filament electrode $3^c$ or the grid electrode $3^a$ and the plate electrode $3^b$. The slab of quartz 1 is used for converting mechanical vibrations into oscillations and the oscillator circuit is adjusted to resonance by the tuned system 5—6. A feed-back arrangement is provided by which sustained oscillations are possible. The quartz plate can either be inserted between the grid and filament electrodes or between the grid and plate electrodes where the circuit is used for the generation of oscillations of different frequencies. For example, the insertion of the piezo electric plate between the grid and plate electrodes gives usually better results for current over 300 kilocycles, while for frequencies below this the insertion of the piezo electric plate between the gird and filament electrode seems to give better results.

Upon completion of the electron tube circuit as described the value of the capacity 6 and inductance 5 may be varied, resulting in the setting up of a transient current whose decay assumes a frequency which is governed by the period of a possible mechanical vibration of the quartz plate. Normally the oscillation will turn into a damped wave train and die out before being observed. If, however, the self-induction of coil 5 of proper magnitude is inserted in the plate circuit, it will, on account of its inertia, effect and feedback through the tube and itself render the circuit regenerative. That is to say, a negative resistance action is produced between the grid and filament electrodes and as such sustains the vibrations due to the quartz. Whenever this happens the plate current indicated by the direct current meter 7 drops to a certain minimum value. The output is considerably increased by use of variable condenser 6 in parallel with the inductance 5 of the plate branch. Where the quartz plate is connected between the filament and the grid, the condenser 6 is set in its minimum capacity position and its capacity is gradually increased. For a certain setting, the oscillations begin to build up and while increasing the capacity 6, the plate current will keep on decreasing until close to the resonance setting of the 5—6 circuit the oscillations stop altogether.

For the quartz plate connected to the plate and the grid electrodes, the capacity 6 has to be gradually decreased from the maximum setting in order to start the oscillations. The building up of the oscillations takes place normally in a fraction of a second but in some cases it may require several seconds and it is then necessary to slowly change the capacity 6. The slow action may be due to either a poor piece of quartz, an unfavorable magnitude of the inductance 5 or the lack of necessary freedom of the quartz plate for oscillator actions, while for the use of a resonator the conductive layers can even be placed on the quartz or clamped against it without disturbing the operation.

The piezo electric plate 2 is connected in an electron tube circuit similar to the arrangement of the electron tube cricuit of tube 3. I have illustrated corresponding parts by means of prime characters.

In Fig. 1 of the drawings, I have shown the inductances 5 and $5'$ magnetically coupled by which the oscillations developed by piezo electric plates 1 and 2 act upon each other to develop a beat frequency equal to the difference of the frequencies of piezo electric plates 1 and 2. In this manner piezo electric plates of relatively small thickness each having a high natural frequency characteristic are so arranged as to secure a reduction in frequency for producing the frequency of an order lower than the two original frequencies. The low frequency oscillations may be taken off from either one of the two high frequency circuits.

In Fig. 2 I have illustrated another circuit arrangement for the separate piezo electric plates where an intermediate circuit 16 is provided having windings 17 and 18 coupled with inductances 5 and $5'$ and connected in an oscillatory circuit tuned by means of condenser 19 to the low frequency oscillations equal to the difference between the frequencies of piezo electric plates 1 and 2. The characteristics of the third circuit 16 are such that a current of the beat frequency of the piezo electric plates 1 and 2 may be emphasized. That is to say, the oscillation constant CL of the circuit 16 satisfies the resonance condition in the formula $$f = \frac{1}{2\pi\sqrt{CL}}$$

where $f = f_1 - f_2$, where $f_1$ represents the frequency of piezo electric plate 1 and $f_2$ represents the frequency of piezo electric plate 2.

When the piezo electric plate is connected between the filament and the grid, the tubing should be such that the combined impedance acts like an inductance while for the connection of the piezo electric plate between the grid and plate electrodes the branch circuit should have an oscillation constant somewhat lower than required by the resonance $$f = \frac{1}{2\pi\sqrt{LC}}$$

and such that the combined effect of capacity and inductance is somewhat capacitive.

In Fig. 3 I have shown another method for producing low frequency oscillations under control of high frequency piezo electric plates. An electron tube 20 is provided having grid electrode 20$^a$, plate electrode 20$^b$, and filament electrode 20$^c$. The filament electrode 20$^c$ is heated from battery 21. The output circuit of the tube 20 contains units as heretofore described in connection with Figs. 1 and 2, that is, high potential battery B, indicating meter 7, and test telephones 8 shunted by condenser 13. Inductance 5 shunted by tuning condenser 6 comprises the tuning element for the oscillatory system. Piezo electric plates 1 and 2 are connected in parallel and in one and the same circuit 22 which generates directly the current of the desired low frequency by interaction of the frequencies developed by each of the plates.

In Figs. 4 and 5 I have illustrated a method by which I am able to obtain a relative low frequency from a piezo electric plate 23 of relatively small size. The piezo electric plate 23 comprises portions 24 and 25 each of different frequencies formed in a step 26. The size of the plate has been exaggerated for the purpose of illustrating the principle of the invention and it will be understood that the step 26 is extremely small. The plate 23 is interposed between metallic conductive plates 27 and 28 which are connected to any desired oscillator or control circuit. It is not necessary that the conductive plates 27 and 28 actually contact with all of the surfaces of the piezo electric plate 23 but that the plates merely be in capacitive relation with respect to the piezo electric plate. The high frequency oscillations of the independent portions 24 and 25 of the piezo electric plate 23 react with each other for developing oscillations of a frequency lower in order than the two original frequencies. By the methods described herein it is practical to produce audio frequency oscillations from piezo electric plates of small size. These oscillations are constant in character and may be employed for various purposes.

It will be understood that piezo electric plates may be cut with several steps or two steps as above and such that the difference in frequency between the respective portions produces a high frequency. In this way one quartz plate could be used for producing many fundamental standard frequencies. The steps may be cut in other faces of the plate than as indicated in Fig. 4.

While I have described the principles of my invention in certain particular embodiments, I desire that it be understood that modifications may be made and that I intend no limitations upon the invention other than those imposed by the scope of the appended claims.

What I claim as new and desire to secure by Letters Patent of the United States is as follows:

1. The method of producing constant frequency oscillations from piezo electric material which consists in developing independent high frequency oscillations along piezo electric axes extending in the same direction from the same piezo electric material and combining the high frequency oscillations thus produced for deriving a beat frequency equal to the difference between said high frequency oscillations.

2. A piezo electric generator of constant frequency oscillations comprising a plate of material possessing piezo electric properties, said plate being ground in stepped formation whereby different portions of said plate generate different high frequency oscillations along piezo electric axes extending substantially in the same direction.

3. A piezo electric generator of constant frequency oscillations comprising in combination an oscillatory circuit, and a piezo electric plate arranged to control said circuit, said piezo electric plate comprising a plurality of portions of different thicknesses for producing high frequency oscillations of different frequency and electrodes adjacent opposite faces of said plate and electrically connected with said circuit whereby said oscillations may be combined in said oscillatory circuit for the production of oscillations of a frequency lower in order than the original frequencies.

4. A piezo electric generator of constant frequency oscillations comprising in combination an oscillatory circuit and a piezo electric plate arranged to control said circuit, said plate comprising a crystalline body ground in step-like formation and electrodes adjacent opposite faces of said plate and connecting said plate in said oscillatory circuit for producing a plurality of different high frequency oscillations simultaneously, said oscillations each corresponding to a natural frequency of different portions of the step-like formation of said plate.

In testimony whereof I affix my signature.

AUGUST HUND.